July 12, 1927.  
F. RAYMAN  
HEATER  
Filed April 22, 1926  
1,635,636  
2 Sheets-Sheet 2
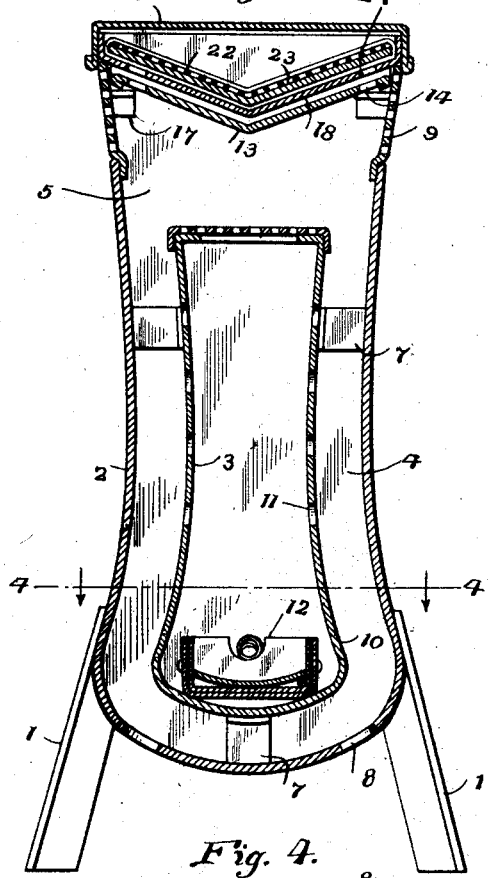
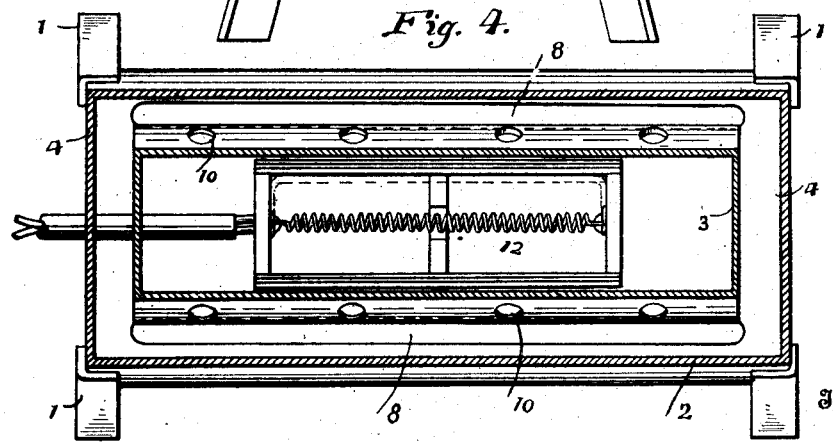
Inventor  
F. Rayman  
By Lacey & Lacey, Attorneys

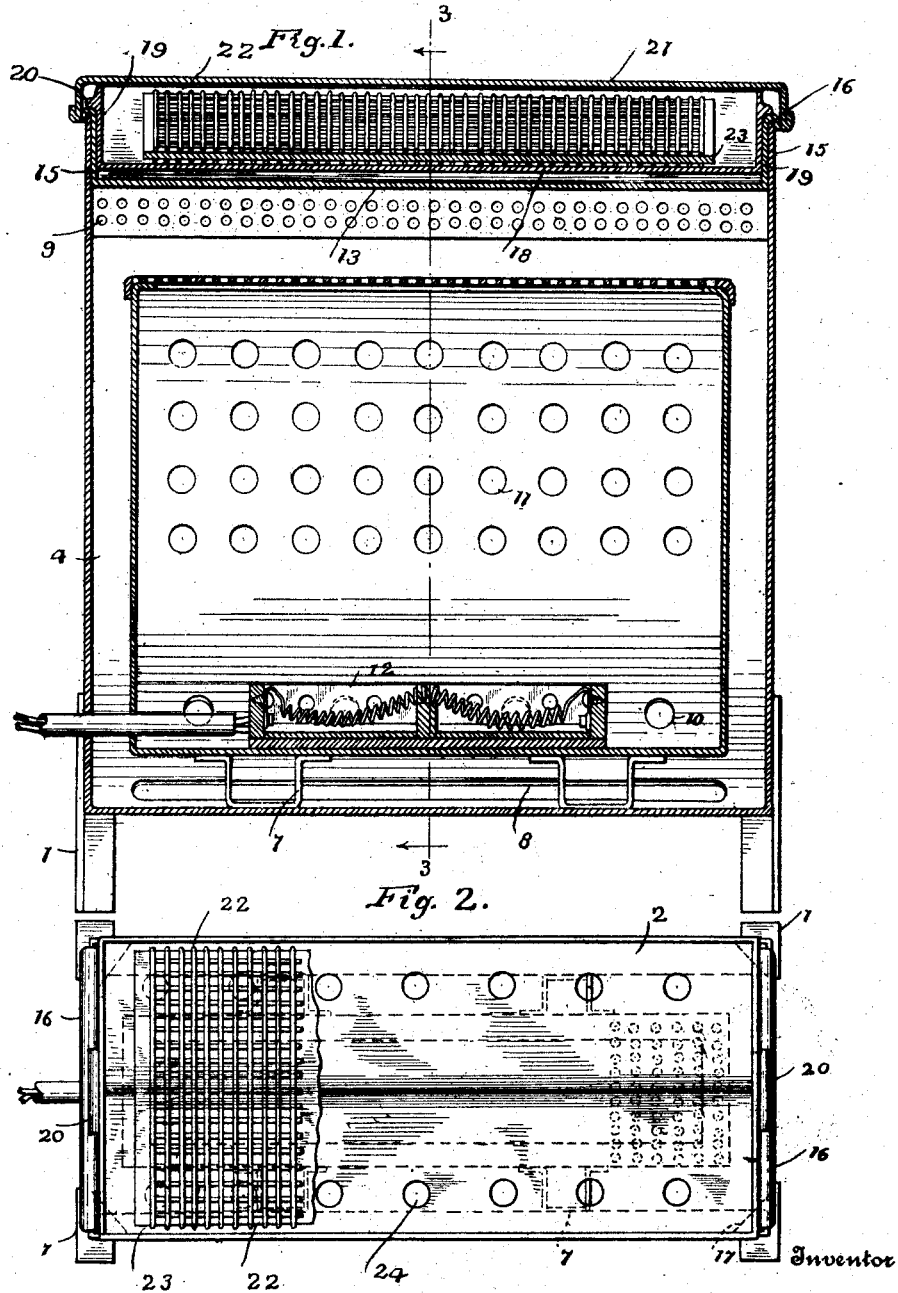

Patented July 12, 1927.

1,635,636

UNITED STATES PATENT OFFICE.

FRANK RAYMAN, OF CHICAGO, ILLINOIS.

HEATER.

Application filed April 22, 1926. Serial No. 103,963.

The invention relates to a portable heater for utilizing electricity, gas or oil as the heat generating medium and including humidifying means for moistening the air to obviate the ills traceable to a hot, dry atmosphere.

The invention contemplates a body embodying inner and outer similar shells, preferably of sheet metal, a heater within the lower portion of the inner shell, a deflector at the top of the body and a humidifier above the deflector, the shells having openings in their sides for the free ingress of cool air and the egress of the air after being heated.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1 is a vertical, central, longitudinal sectional view of a heater embodying the invention, Figure 2 is a top plan view of the heater, an end portion of the cover being broken away, Figure 3 is a transverse sectional view on the line 3—3 of Figure 1, looking in the direction of the arrows, and Figure 4 is a horizontal sectional view on the line 4—4 of Figure 3.

Corresponding and like parts are referred to in the following description and designated in the several views of the drawings by like reference characters.

The heater is mounted upon legs 1 and comprises an outer shell 2 and an inner shell 3, the shells being preferably of like outline, and of such relative dimensions as to leave a space 4 entirely surrounding the bottom and sides of the inner shell 3 and a space 5 above the top of the inner shell to which is fitted a perforated cover 6. The end walls of the shells are flat and parallel, whereas the side walls are inwardly curved and the bottoms made rounding transversely. Braces 7 are interposed between the two shells to maintain them in spaced relation. Openings 8 are formed in opposite sides of the bottom of the outer shell 2 and these openings are in the nature of slots, as indicated most clearly in Figures 1 and 4. The upper portion of the side walls of the outer shell 2 is perforated or formed with closely related openings 9 for the escape of the heated air. The perforated portions 9 of the side walls flare and may be separate from the main portion of the side walls and jointed thereto in any preferred way.

The side walls of the inner shell 3 are formed in their lower portions with openings 10 and in their upper portion with openings 11. The cool air enters the lower openings 10 and is heated and the warm air passes outwardly through the openings 11 into the space 4, thence upwardly and out through the openings 9. The heater proper is designated by the numeral 12 and is located within the lower portion of the inner shell 3 and may be of any preferred type utilizing electricity, gas or oil as means for generating the heat. The heater 12, illustrated, is of a conventional electric type and is preferred where electricity is available at a non-prohibitive cost. The type of heater will usually depend upon the nature of the fuel available.

A baffle 13 is located within the upper portion of the outer shell 2 and extends the full width and length thereof. This baffle comprises upwardly and outwardly inclined portions, as shown most clearly in Figure 3, and operates to arrest the upwardly ascending current of hot air and directs the same laterally through the openings 9 in the outwardly flared upper portion of the side walls of the outer shell 2. Openings 14 are formed along the outer edges of the baffle 13 for the passage of a portion of the warm air. End pieces 15 project upwardly from the extremities of the baffle 13 and are recurved at their upper edges, as indicated at 16, to engage over the end wall of the outer shell, and hold the baffle in suspension. In this manner, the upper portion of the outer shell is reinforced and the same is further strengthened by corner braces 17.

A tray 18 rests upon the upper ends of the enclosing walls of the shell 2 and its bottom is spaced from the baffle 13 and comprises oppositely inclined portions conforming thereto, as indicated most clearly in Figure 3. The ends 19 of the tray 18 are disposed to engage the inner sides of the end pieces 15 of the baffle 13, as indicated most clearly in Figure 1, and have outwardly disposed projections 20 to engage over and rest upon the recurved portions 16 of the end pieces 15. The sides of the tray 18 project above the top of the outer shell 2 and receive a cover 21, the depending flange of which engages about the upper portion of the outer shell. Spaced layers of wire fabric 22 are placed upon the bottom of the tray 18 and conform thereto and a layer 23 of asbestos or other suitable material, is interposed between the layers 22. The layers 22 may consist of foraminous or reticulated material to admit of ready escape of the moisture incident to evaporation of the water absorbed by the layer 23. The parts 22 and 23 constitute elements of a humidifier, the part 23 being of sufficient thickness to absorb a quantity of water to last for an appreciable period of time. Openings 24 are formed along oppossite edge portions of the bottom of the tray 18 for the circulation of warm air to carry off the vapor resulting from evaporation of the water contained within the humidifier.

The heater is constructed solely of sheet metal, hence is portable, light and cheap, and the exterior may be finished in any preferred way to harmonize with the furnishings and interior of a room, or other place for which the device is intended. When the heater 12 is in operation it serves to heat the cool air entering through the openings 8 and 10, of the outer and inner shells and the heated air rising within the inner shell 3 escapes through the openings 11 into the space 4 and from thence into the space 5 and is arrested and deflected laterally through the openings 9. A portion of the heated air passes through the openings 14 and 24 and effects evaporation of the water contained in the humidifier and as the evaporation is slight and the parts have a loose fit the moisture finds an escape and humidifies the air, thus counteracting and overcoming the ills incident to hot dry air, both for respiration and heating.

Having thus described the invention, I claim:

1. A device of the character specified, comprising similar spaced inner and outer shells, the inner shell terminating short of the top of the outer shell to leave a space thereabove in communication with the space formed between the two shells, there being openings in the lower portion of the two shells for the ingress of cool air and openings in the upper portion for egress of the warm air, a heater within the lower portion of the inner shell, a baffle within the upper portion of the outer shell and comprising upwardly and outwardly inclined portions, and a humidifier within the upper portion of the outer shell, spaced from the baffle and conforming thereto.

2. A device of the character specified, comprising similar spaced inner and outer shells, the inner shell terminating short of the top of the outer shell to leave a space thereabove in communication with the space formed between the two shells, there being openings in the lower portion of the two shells for the ingress of cool air, and openings in the upper portion for egress of the warm air, a heater within the lower portion of the inner shell, a baffle within the upper portion of the outer shell and comprising upwardly and outwardly inclined portions, and a humidifier within the upper portion of the outer shell spaced from the baffle and conforming thereto, said humidifier consisting of a layer of absorbent material and upper and lower layers having the absorbent layer therebetween and serving as reinforcing means therefor and having innumerable openings to provide escape for the vapor resulting from evaporation.

3. A device of the character specified, comprising similar spaced inner and outer shells, the inner shell terminating short of the top of the outer shell to leave a space thereabove in communication with the space formed between the two shells, there being openings in the lower portion of the two shells for the ingress of cool air and openings in the upper portion for egress of the warm air, a heater within the lower portion of the inner shell, a baffle within the upper portion of the outer shell and comprising upwardly and outwardly inclined portions and end walls having their upper edges recurved to engage over the upper edges of the end walls of the outer shell, and a humidifier within the upper portion of the outer shell spaced from the baffle and conforming thereto, a tray disposed above the baffle in spaced relation thereto and including end pieces having outwardly disposed portions to engage over the upper recurved edges of the end walls of the baffle, and a humidifier supported upon the bottom of the tray.

4. A device of the character specified, comprising a narrow, tall, elongated body, comprising similar spaced inner and outer shells having their bottoms round and sides inwardly curved, there being openings in the lower portions of the shells and in the sides thereof, the inner shell terminating short of the top of the outer shell, a perforated cover applied to the top of the inner shell, a heater within the lower portion of the inner shell, a baffle supported within the upper portion of the outer shell and comprising upwardly and outwardly inclined portions, a tray supported within the baffle and spaced therefrom, and conforming in outline thereto, there being openings in the outer edge portions of the baffle and tray, a humidifier within the tray comprising a layer of absorbent material and upper and lower layers of reinforcing material and a cover closing the top of the outer shell and concealing and protecting the humidifier and tray.

In testimony whereof I affix my signature.

FRANK RAYMAN. [L. S.]